United States Patent
Lee et al.

(10) Patent No.: US 10,503,951 B2
(45) Date of Patent: Dec. 10, 2019

(54) RAPID IDENTIFICATION METHOD FOR FINGERPRINT

(71) Applicant: SUPERC-TOUCH CORPORATION, New Taipei (TW)

(72) Inventors: Hsiang-Yu Lee, New Taipei (TW); Shang Chin, New Taipei (TW); Ping-Tsun Lin, New Taipei (TW); Chia-Hsun Tu, New Taipei (TW)

(73) Assignee: SUPERC-TOUCH CORPORATION, New Taipei (TW)

( * ) Notice: Subject to any disclaimer, the term of this patent is extended or adjusted under 35 U.S.C. 154(b) by 25 days.

(21) Appl. No.: 15/908,784

(22) Filed: Feb. 28, 2018

(65) Prior Publication Data

US 2019/0266380 A1  Aug. 29, 2019

(51) Int. Cl.
*G06K 9/00* (2006.01)
*H04L 29/06* (2006.01)

(52) U.S. Cl.
CPC ......... *G06K 9/00026* (2013.01); *G06K 9/001* (2013.01); *G06K 9/00067* (2013.01); *G06K 9/00093* (2013.01); *H04L 63/10* (2013.01)

(58) Field of Classification Search
CPC ........... G06K 9/00093; G06K 9/00026; G06K 9/00046; G06K 9/00067; G06K 9/0008; G06K 9/00926; G06K 9/001; G06F 2203/0338; G06F 3/0317; G06F 3/03547; G06F 21/32
USPC ........................................................ 382/125
See application file for complete search history.

(56) References Cited

U.S. PATENT DOCUMENTS

| | | | | |
|---|---|---|---|---|
| 5,933,516 | A * | 8/1999 | Tu ...................... | G06K 9/00093 382/125 |
| 6,785,408 | B1 * | 8/2004 | Setlak .................. | G06K 9/0008 340/5.83 |
| 2004/0208346 | A1 * | 10/2004 | Baharav ................ | G06F 3/0317 382/124 |
| 2004/0208347 | A1 * | 10/2004 | Baharav ................ | G06F 3/0317 382/124 |
| 2011/0298711 | A1 * | 12/2011 | Dean .................... | G06F 3/03547 345/161 |

(Continued)

*Primary Examiner* — Ali Bayat
(74) *Attorney, Agent, or Firm* — Chun-Ming Shih; HDLS IPR Services (57) ABSTRACT

A rapid identification method for fingerprint first provides a fingerprint identification apparatus having a fingerprint sensing area and divides the fingerprint sensing area into fingerprint sensing sub-regions. In a registration stage, the method performs fingerprint sensing for the entire fingerprint sensing area to obtain fingerprint image for a whole fingerprint sensing area, fingerprint minutiae and relevant locations for the fingerprint minutiae and then pre-stores those data. In an identification stage, the method performs fingerprint sensing on a part of the fingerprint sensing sub-regions for a user to be identified and detects fingerprint minutiae and relevant locations for the fingerprint minutiae in the part of the fingerprint sensing sub-regions. The method compares the fingerprint minutiae and relevant locations detected in the identification stage with respect to the corresponding fingerprint minutiae and relevant locations in the registration stage in order to determine whether the user can be granted with access right.

20 Claims, 6 Drawing Sheets

(56) References Cited

U.S. PATENT DOCUMENTS

2012/0070043 A1* 3/2012 Higuchi ............... A61B 5/1172
　　　　　　　　　　　　　　　　　　　　　382/124
2016/0132712 A1* 5/2016 Yang .................... G06K 9/0002
　　　　　　　　　　　　　　　　　　　　　348/77
2017/0085562 A1* 3/2017 Schultz ............... H04L 63/0861

* cited by examiner

| (A) 8 | (B) 4  | (C) 0 |
|-------|--------|-------|
| (D) 1 | (E) 10 | (F) 4 |
| (G) 0 | (H) 2  | (I) 6 |

FIG.7A

| (A) 5 | (B) 5  | (C) X |
|-------|--------|-------|
| (D) X | (E) 10 | (F) 1 |
| (G) X | (H) X  | (I) 5 |

RAPID IDENTIFICATION METHOD FOR FINGERPRINT

BACKGROUND OF THE INVENTION

Field of the Invention

The method relates to an identification method for fingerprint, especially to a rapid identification method for fingerprint.

Description of Prior Art

Biometric identification technologies have rapid development due to the strong demand from electronic security applications and remote payment. The biometric identification technologies can be classified into fingerprint identification, iris identification and DNA identification and so on. For the considerations of efficiency, safety and non-invasiveness, the fingerprint identification becomes main stream technology. The fingerprint identification device can scan fingerprint image by optical scanning, thermal imaging or capacitive imaging. For cost, power-saving, reliability and security concerns, the capacitive fingerprint sensor becomes popular for biometric identification technology applied to portable electronic devices.

The conventional capacitive fingerprint sensors can be classified into swipe type and area type (pressing type), and the area type has better identification correctness, efficiency and convenience. However, the area type capacitive fingerprint sensor generally integrates the sensing electrodes and the sensing circuit into one integrated circuit (IC) because the sensed signals are minute and the background noise is huge in comparison with the minute sensed signals. In conventional mobile device, the fingerprint sensor thereof has effective sensing area smaller than 0.5 square centimeters. The number of the extracted minutiae is limited. Therefore, this kind of mobile device is risky when it is applied to mobile payment application. The conventional ID card and credit card suffer to the problems of forging and fraud, and they need to be equipped with fingerprint sensing technology to enhance security. The security of ID card and credit card is more satisfactory when the number of the extracted minutiae is large enough. However, a large-area fingerprint sensor needs more processing time for identification. It is an important issue for this industry to develop a rapid identification method for a large-area biometric sensor.

SUMMARY OF THE INVENTION

It is one of the objects of the present invention to provide a rapid identification method for fingerprint.

Accordingly, the rapid identification method for fingerprint according to the present invention comprises:

(a) providing a fingerprint identification apparatus having a fingerprint sensing area, a circumference of fingerprint sensing area being not less than 48 mm; dividing the fingerprint sensing area into a plurality of fingerprint sensing sub-regions for fingerprint sensing;

(b) performing fingerprint sensing for all of the fingerprint sensing sub-regions to obtain fingerprint image for a whole fingerprint sensing area, a plurality of fingerprint minutiae and relevant locations for the fingerprint minutiae; pre-storing the fingerprint minutiae and relevant locations for the fingerprint minutiae corresponding to the whole fingerprint sensing area in the fingerprint identification apparatus;

(c) based on the pre-stored fingerprint minutiae and relevant locations, performing fingerprint sensing on a part of the fingerprint sensing sub-regions for a user to be identified and detecting a plurality of fingerprint minutiae and relevant locations for the fingerprint minutiae in the part of the fingerprint sensing sub-regions;

(d) comparing the fingerprint minutiae and relevant locations for the fingerprint minutiae detected in the step (c) and the corresponding fingerprint minutiae and relevant locations for the fingerprint minutiae pre-stored in the step (b) in order to determine whether the user can be granted with access right.

BRIEF DESCRIPTION OF DRAWING

One or more embodiments of the present disclosure are illustrated by way of example and not limitation in the figures of the accompanying drawings, in which like references indicate similar elements. These drawings are not necessarily drawn to scale.

DETAILED DESCRIPTION OF THE INVENTION

Figure 1:
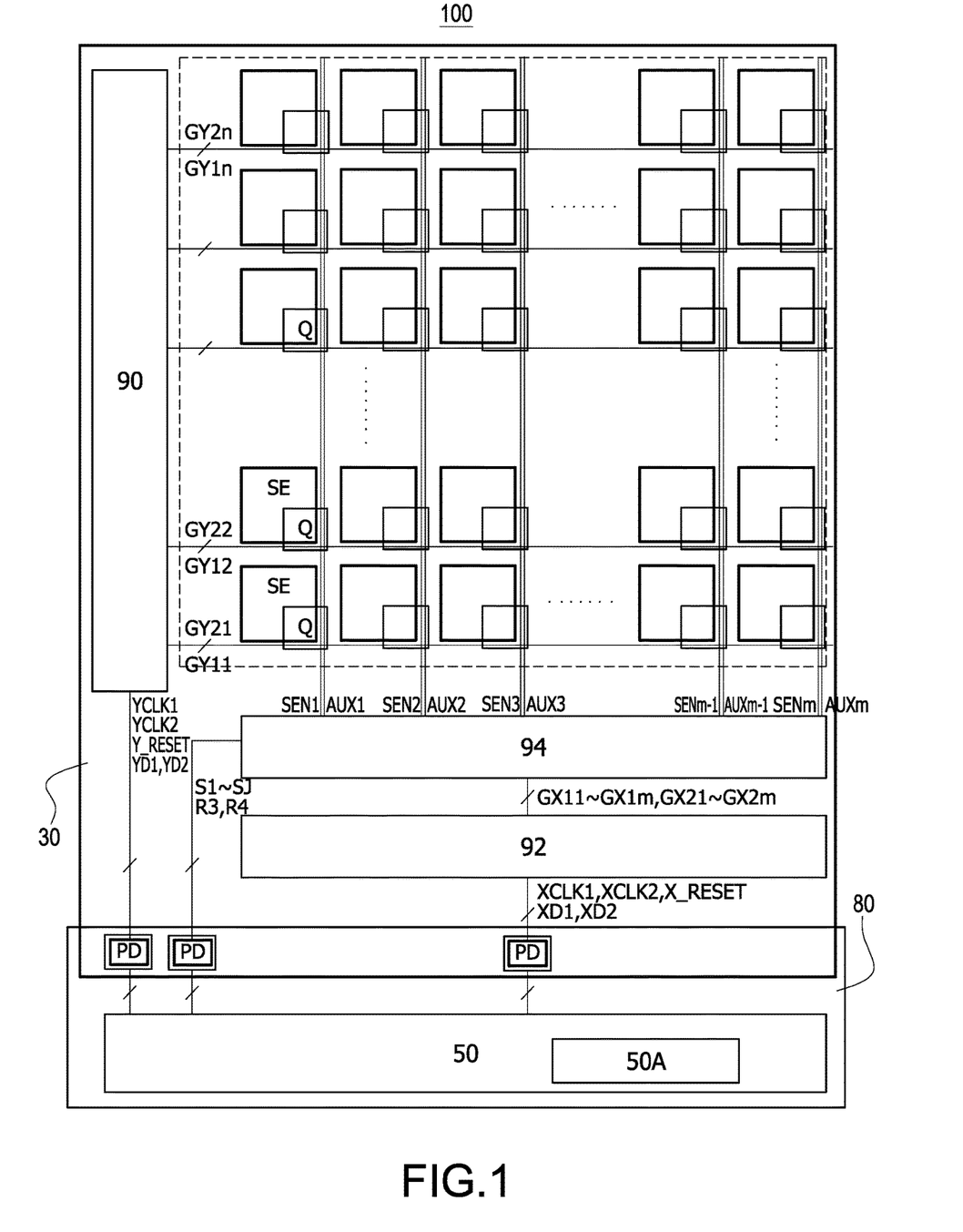
FIG. 1 shows a circuit block diagram of the fingerprint identification apparatus applicable to the rapid identification method for fingerprint according to an embodiment of the present invention.
Figure 2:
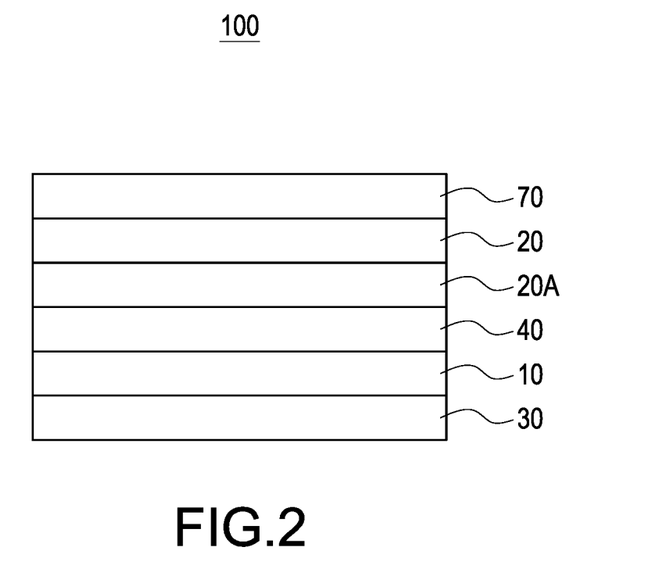
FIG. 2 shows the layered structure of the fingerprint identification apparatus own in FIG. 1.

FIG. 1 shows a circuit block diagram of the fingerprint identification apparatus 100 applicable to the rapid identification method for fingerprint according to an embodiment of the present invention. FIG. 2 shows the layered structure of the fingerprint identification apparatus 100 own in FIG. 1.

As shown in FIG. 2, the fingerprint identification apparatus 100 applicable to the method according to an embodiment of the present invention comprises, from top to bottom, at least a protection layer 70 (or a hard coating layer), a sensing electrode layer 20, an insulating layer 20A, a noise-shielding layer 40, a thin film transistor (TFT) switch set layer 10 and a substrate 30. The fingerprint identification apparatus 100 further comprises a plurality of signal lines respectively connected to the gate and source (drain) of the corresponding TFT switch (such as the TFT switch Q shown in FIG. 1). The source (drain) of the TFT switch is electrically connected to the corresponding sensing electrode (such as the sensing electrode shown in FIG. 1) in the sensing electrode layer 20 to apply the capacitance-exciting signal thereto or to receive fingerprint sensing signal therefrom. The substrate 30 shown in FIG. 2 may be a glass substrate, a polymer thin film substrate, a sapphire substrate or a metal foil substrate. Moreover, the sensing electrode layer 20, the insulating layer 20A, the noise-shielding layer 40, the TFT switch set layer 10 and other elements (not shown) form a sensing electrode matrix area, and the sensing electrode matrix area is arranged on one side of the substrate 30.

With reference now to FIG. 1, besides the elements shown in FIG. 2, the fingerprint identification apparatus 100 further comprises a first shift register 90, a second shift register 92, a multiplexer 94 and a fingerprint sensing integrated circuit (IC) 50 (for example, the fingerprint sensing IC 50 may comprise a self-capacitance sensing circuit 50A). The fingerprint sensing IC 50 is electrically connected to the corresponding elements on the substrate 30 through a flexible circuit board 80. In another embodiment, the fingerprint sensing IC 50 may also be directly bonded to or pressure welded to the substrate 30. The fingerprint sensing IC 50 sends the X direction clock signals XCLK1, XCLK2, X direction reset signal X_RESET and X direction control signals XD1, XD2 through the conduction pads PD to the second shift register 92 (X direction shift register). Moreover, the fingerprint sensing IC 50 sends the Y direction clock signals YCLK1, YCLK2, Y direction reset signal Y_RESET and Y direction control signals YD1, YD2 through the conduction pads PD to the first shift register 90 (Y direction shift register). Moreover, the fingerprint sensing IC 50 sends the capacitance-exciting signals S1~SJ, auxiliary signals (such as the fingerprint deflection signals R3 and the stabilization-convergent signals R4) to the multiplexer 94 through the conduction pads PD. The fingerprint sensing IC 50 controls the multiplexer 94, through the parallel outputs GX11~GX1m and GX21~GX2m of the second shift register 92, to apply the capacitance-exciting signals S1~SJ, the fingerprint deflection signals R3 and the stabilization-convergent signals R4 to the selected ones of the sensing signal lines SEN1~SENm and the corresponding auxiliary signal lines AUX1~AUXm such that the capacitance-exciting signals S1~SJ, the fingerprint deflection signals R3 and the stabilization-convergent signals R4 may be applied to selected sensing electrodes in the sensing electrode matrix area. Moreover, for the fingerprint identification apparatus 100 with self-capacitance sensing scheme, the fingerprint sensing IC 50 inputs (receives) the fingerprint sensing signals from the selected sensing electrodes through the conduction pads and the multiplexer 94. The first shift register 90 receives the Y direction control signals YD1, YD2 from the fingerprint sensing IC 50 and then outputs corresponding signals for the switch set control signal lines GY11~GY1n, GY21~GY2n of the sensing electrode matrix area according to the corresponding clock signals. In the fingerprint identification apparatus 100, each of the sensing electrodes is corresponding to one TFT switch set and each of the TFT switch sets comprises at least two TFT switches Q. Therefore, n rows of sensing electrodes need 2n switch set control signal lines. In other embodiments, the fingerprint identification apparatus 100 may only need the first shift register 90 and the second shift register 92 can be dispensed with. The fingerprint sensing IC 50 may directly send the control signals GX11~GX1m and GX21~GX2m to the multiplexer 94 through the conduction pads PD, thus enhance the sensing speed for fingerprint.

Figure 3:
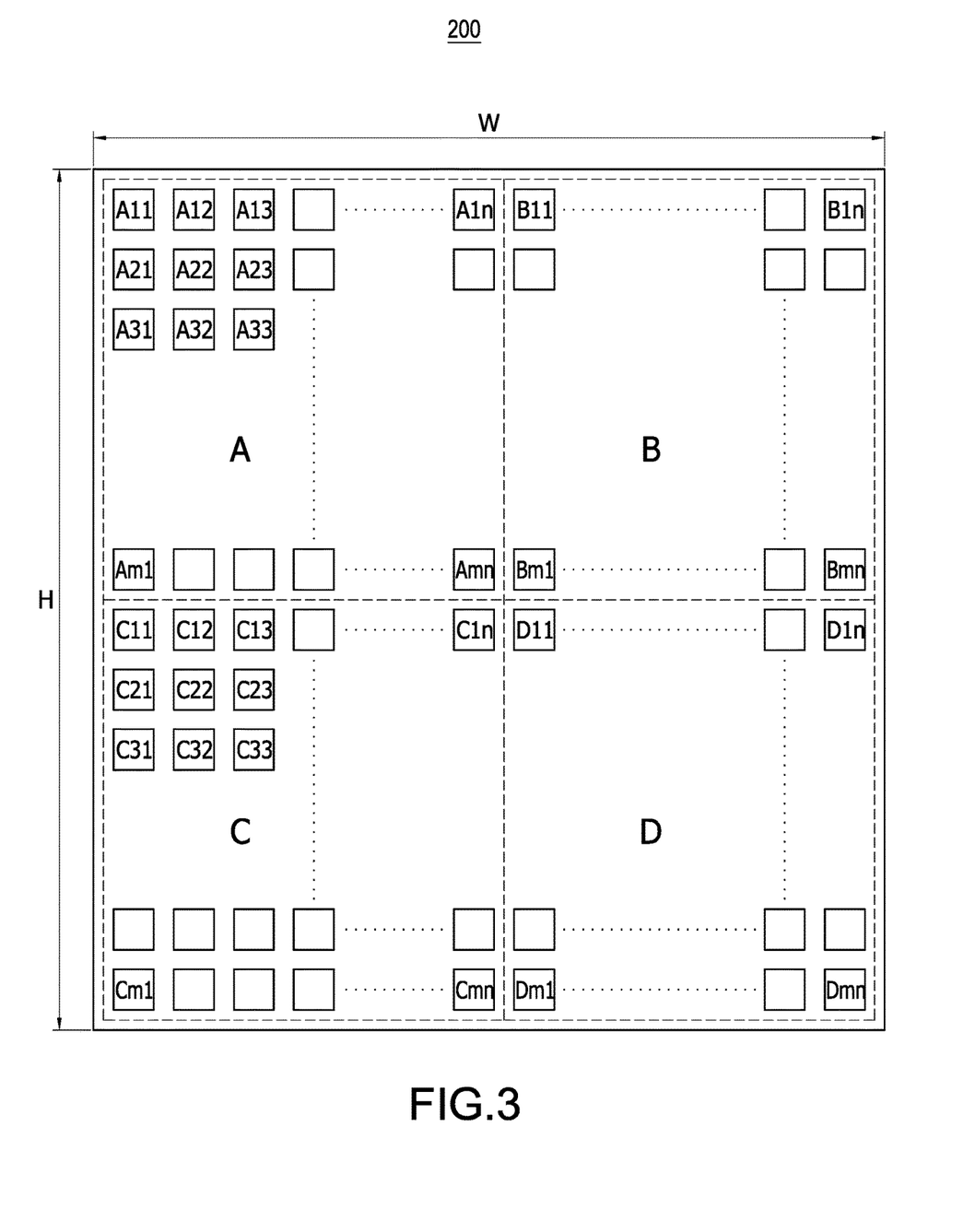
FIG. 3 shows the allocation of the fingerprint sensing area according to the rapid fingerprint identification method of the present invention.

FIG. 3 shows the allocation of the fingerprint sensing area 200 according to the rapid fingerprint identification method of the present invention. As shown in this figure, the circumference of the fingerprint sensing area 200 is not less than 48 mm, namely larger than or equal to 48 mm. Provided that the fingerprint sensing area 200 is of rectangular shape from projected view, then the circumference of the fingerprint sensing area 200, namely, 2W+2H, is not less than 48 mm, where W indicates width and H indicates length. The fingerprint sensing area 200 is divided (allocated) into a plurality of fingerprint sensing sub-regions A, B, C and D, and each of the fingerprint sensing sub-regions comprises a plurality of sensing electrodes. For example, the fingerprint sensing sub-region A comprises sensing electrodes A11, A12 ... A1n, A21 ... Amn; the fingerprint sensing sub-region B comprises sensing electrodes B11, B12 ... B1n, B21 ... Bmn and so on. However, the example shown in FIG. 3 is used only for demonstration and not limitation of the present invention. Therefore, the total number of the fingerprint sensing sub-region is not limited to four, and the fingerprint sensing area 200 may have different allocation other than that shown in FIG. 3.

Figure 4:
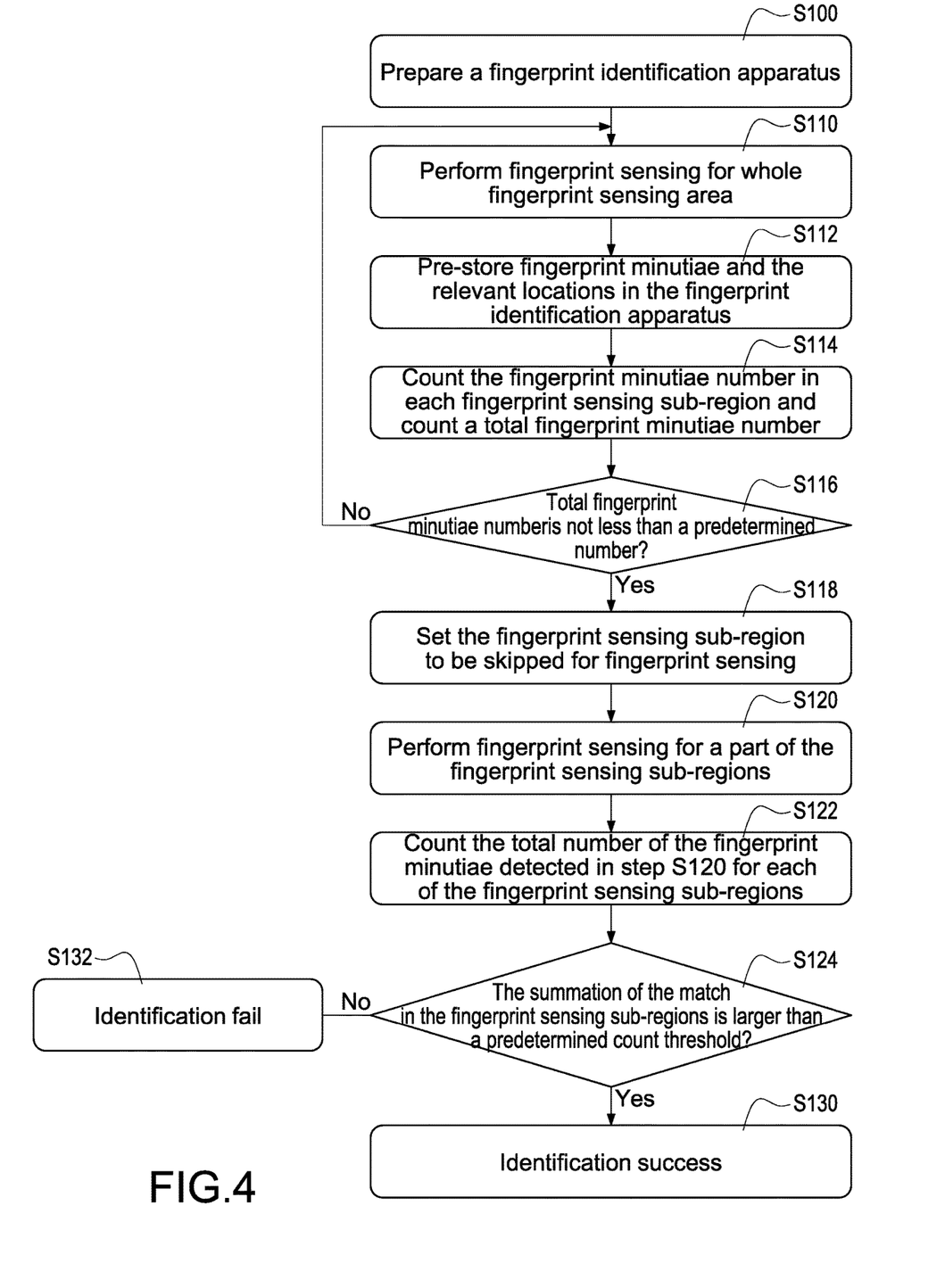
FIG. 4 shows the flowchart for the rapid fingerprint identification method according to an embodiment of the present invention.
Figure 5:
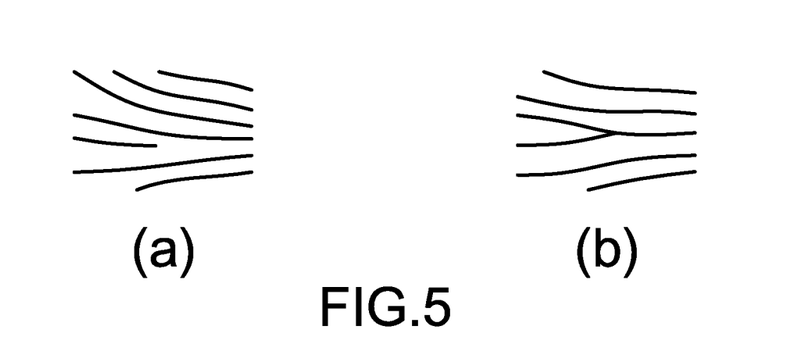
FIG. 5 is a schematic view showing two fingerprint minutiae, namely (a) ridge end and (b) bifurcation.
Figure 6:
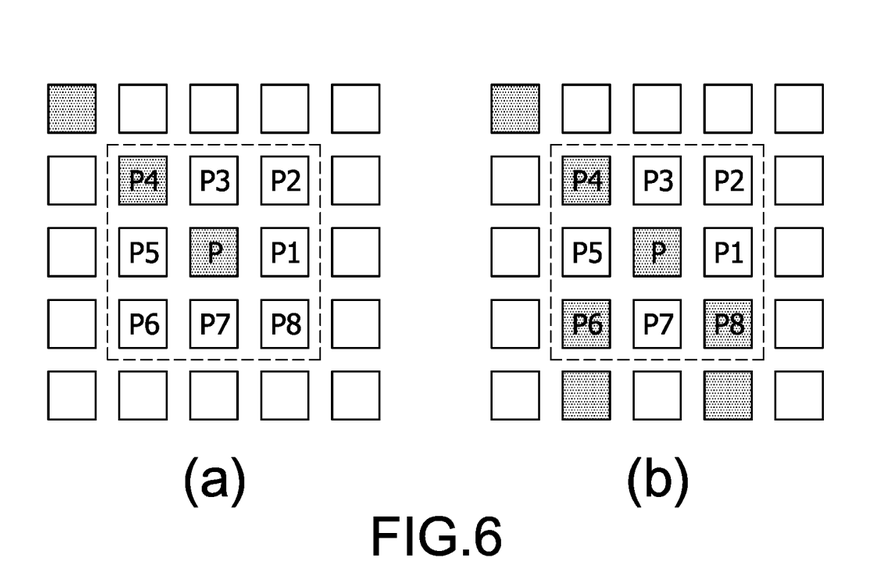
FIG. 6 shows an exemplary way for minutiae extraction algorithm.

FIG. 4 shows the flowchart for the rapid fingerprint identification method according to an embodiment of the present invention. At first a fingerprint identification apparatus 100 is provided in step S100, and the fingerprint identification apparatus 100 has a fingerprint sensing area 200 with a circumference not less than 48 mm. The fingerprint sensing IC 50 divides the fingerprint sensing area 200 into a plurality of fingerprint sensing sub-regions by programming. The fingerprint sensing IC 50 then performs a fingerprint sensing for the whole fingerprint sensing area 200 (namely entire fingerprint sensing area 200) to obtain fingerprint image for the whole fingerprint sensing area, a plurality of fingerprint minutiae and the relevant locations for the fingerprint minutiae in step S110. According to one implementation of the present invention, the fingerprint minutiae may include: ridge end, bifurcation, crossover, short ridge, spike, island and bridge. FIG. 5 is a schematic view showing two fingerprint minutiae, namely (a) ridge end and (b) bifurcation. FIG. 6 shows an exemplary way for minutiae extraction, namely, crossing number (CN) algorithm. As shown in this figure, the CN algorithm performs counterclockwise scan for a pixel P (namely, a sensing electrode) to scan 8 nearby pixels P1~P8, and calculate CN based on following equation:

$$CN = \tfrac{1}{2} \times \Sigma_{i=1}^{8} |P_i - P_{i+1}| \text{(Note: } P9 = P1) \qquad (1)$$

As shown in FIG. 6, for the part (a) the processed pixel is ridge end minutiae when CN=1, and t, for the part (b) the processed pixel is bifurcation minutiae when CN=3. With reference back to FIG. 3, if the sensing electrode A22 is corresponding to the pixel P in FIG. 6 and CN=3, then the sensing electrode A22 has bifurcation minutiae. If the sensing electrode A22 is corresponding to the pixel P in FIG. 6 and CN=1, then the sensing electrode A22 has ridge end minutiae. In the present invention, the fingerprint sensing IC 50 may perform fingerprint sensing for at least two fingerprint sensing sub-regions at the same time, for example, perform fingerprint sensing for the two fingerprint sensing sub-regions A and C at the same time. In another embodiment, the fingerprint sensing IC 50 may perform fingerprint sensing for the fingerprint sensing sub-regions one by one. After finishing fingerprint sensing, the fingerprint sensing IC 50 pre-stores the extracted fingerprint minutiae and the relevant locations for the fingerprint minutiae in a memory unit (not shown) of the fingerprint identification apparatus 100, thus store data in a registration stage (step S112). Taking the above example for further description, the fingerprint sensing IC 50 records that a bifurcation minutia is present at location corresponding to the sensing electrode A22 and a ridge end minutia is present at location corresponding to the sensing electrode C22. Moreover, the fingerprint sensing IC 50 counts the fingerprint minutiae number in each of the fingerprint sensing sub-regions, and a total fingerprint minutiae number in the whole fingerprint sensing area, namely the sum for the fingerprint minutiae numbers in all of the fingerprint sensing sub-regions in step S114.

According to an embodiment of the present invention, the relevant locations may include the location number for the fingerprint sensing sub-region and the relative coordinate of the fingerprint minutia in the fingerprint sensing sub-region. Taking the above example shown in FIG. 3 for further description, the fingerprint sensing IC 50 detects a fingerprint minutia in the fingerprint sensing sub-region A and at the relative coordinate (2, 2), namely, the second row and the second column counted from top border and left border of the fingerprint sensing sub-region A, then the fingerprint sensing IC 50 records the relevant location for the detected fingerprint minutia, such as fingerprint sensing sub-region A and relative coordinate (2, 2), and records the type of the detected fingerprint minutia such as bifurcation minutia or ridge end minutia and so on. The fingerprint sensing IC 50 detects a fingerprint minutia in the fingerprint sensing sub-region C and at the relative coordinate (2, 2), namely, the second row and the second column counted from top border and left border of the fingerprint sensing sub-region C, then the fingerprint sensing IC 50 records the relevant locations for the detected fingerprint minutia, such as fingerprint sensing sub-region C and relative coordinate (2, 2), and records the type of the detected fingerprint minutia such as bifurcation minutia or ridge end minutia and so on.

According to another embodiment of the present invention, the relevant locations may include the absolute coordinate in the whole fingerprint sensing area. Taking the above example shown in FIG. 3 for further description, the fingerprint minutia in the fingerprint sensing sub-region A with relative coordinate (2, 2) has the absolute coordinate (2, 2) of the whole fingerprint sensing area if the absolute coordinate is counted from the top border and left border of the whole fingerprint sensing area. Moreover, the fingerprint minutia in the fingerprint sensing sub-region C with relative coordinate (2, 2) has the absolute coordinate (m+2, 2) of the whole fingerprint sensing area. Therefore, the fingerprint sensing IC 50 records the relevant locations for the detected fingerprint minutia with absolute coordinate (2, 2) and the type of the detected fingerprint minutia, and records the relevant locations for the detected fingerprint minutia with absolute coordinate (m+2, 2) and the type of the detected fingerprint minutia. For example, in this embodiment, the fingerprint sensing IC 50 records that the relevant location has absolute coordinate (2, 2) and the type of the detected fingerprint minutia is bifurcation minutia; and the relevant location has absolute coordinate (m+2) and the type of the detected fingerprint minutia is ridge end minutia.

After step S114, the fingerprint sensing IC 50 determines whether the sum for the fingerprint minutiae numbers in all of the fingerprint sensing sub-regions is not less than a predetermined number such as 20 fingerprint minutiae in step S116. If the fingerprint sensing IC 50 determines that the sum for the fingerprint minutiae numbers in all of the fingerprint sensing sub-regions is less than the predetermined number, it means the registration is not successful (namely, the data establishment is not successful). For example, if the pressing location of user finger may be not correct or the user finger may be dirty, the sensing result will be wrong. The fingerprint sensing IC 50 control the process back to step S110 and may prompt user to press his finger again. For example, the fingerprint identification apparatus 100 may display by a screen with prompt message or alarm user-hearable prompt such as voice or alert tone). After the user presses his finger again, the fingerprint sensing IC 50 will re-execute the step S110 to perform a fingerprint sensing for the whole fingerprint sensing area 200 again to obtain fingerprint image for the whole fingerprint sensing area, to obtain a plurality of fingerprint minutiae and the relevant locations for the fingerprint minutiae, re-execute the step S112 to pre-store the fingerprint minutiae and the relevant locations for the fingerprint minutiae in a memory unit of the fingerprint identification apparatus 100, re-execute the step S114 to count the fingerprint minutiae number in each of the fingerprint sensing sub-regions and a total fingerprint minutiae number in the whole fingerprint sensing area, and then re-execute the step S116 to determine whether the sum for the fingerprint minutiae numbers in all of the fingerprint sensing sub-regions is not less than the predetermined number. The fingerprint sensing IC 50 will keep asking the user to press his finger again for fingerprint sensing until the sum for the fingerprint minutiae numbers in all of the fingerprint sensing sub-regions is not less than the predetermined number.

After the step S116, if the sum for the fingerprint minutiae numbers in all of the fingerprint sensing sub-regions is not less than the predetermined number, the fingerprint sensing IC 50 optionally determines whether the sum for the fingerprint minutiae numbers in all of the fingerprint sensing sub-regions is larger than a larger threshold, which is larger than the predetermined number and is for example 100. If the sum for the fingerprint minutiae numbers in all of the fingerprint sensing sub-regions is larger than the larger threshold, it means the detected fingerprint minutiae are undesirably excessive. This will prolong the future processing time for future identification. In this situation, the fingerprint sensing IC 50 may select part of the fingerprint sensing sub-regions from the whole fingerprint sensing area and use the selected fingerprint sensing sub-regions (for example, the fingerprint sensing sub-regions A and B) for future identification process. Moreover, to select the fingerprint sensing sub-regions for future identification, the fingerprint sensing IC 50 needs to ensure that the sum for the fingerprint minutiae numbers in the selected fingerprint sensing sub-regions (namely, the fingerprint sensing sub-regions A and B) is not less than the predetermined number. Therefore, the database with reduced number of fingerprint minutiae can speed up the identification process while the total number of the fingerprint minutiae in the selected fingerprint sensing sub-regions still can ensure identification accuracy. Moreover, the fingerprint sensing IC 50 may re-allocate (re-divide) the fingerprint sensing sub-regions A and B. For example, the fingerprint sensing sub-region A is further divided into fingerprint sensing sub-regions A1 and A2, and the fingerprint sensing sub-region B is further divided into fingerprint sensing sub-regions B1 and B2 to further speed up the identification process.

Figure 7A:
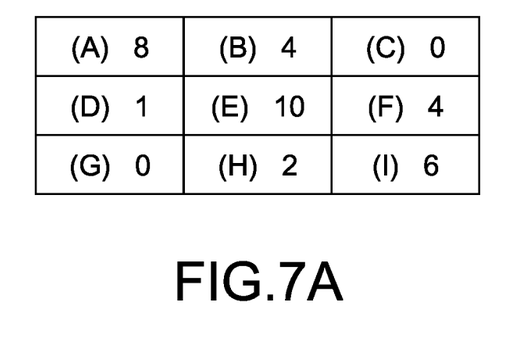
FIG. 7A is a schematic diagram showing the statistic of fingerprint minutiae in the sensing sub-regions, which are pre-stored in the registration stage.

After step S116, the fingerprint sensing IC 50 optionally executes the step S118 to set up the fingerprint sensing sub-regions to be skipped in the future user identification process for granting user request or access right. With reference to FIG. 7A, according to an embodiment, if the fingerprint sensing area 200 has nine fingerprint sensing sub-regions A, B, C, D, E, F, G, H, and I; moreover, the fingerprint minutiae number counted the fingerprint sensing sub-regions C and G is zero in the step S114. Namely, each of the fingerprint sensing sub-regions C and G has no detected fingerprint minutia in the step S114. According to one embodiment of the present invention, in the user identification process for granting user request or access right, the fingerprint sensing IC 50 will not perform fingerprint sensing for the fingerprint sensing sub-regions C and G (the fingerprint sensing for the fingerprint sensing sub-regions C and G is skipped), namely, for the fingerprint sensing sub-region without any detected fingerprint minutia. According to another embodiment of the present invention, in the user identification process for granting user request or access right, the fingerprint sensing IC 50 will not perform fingerprint sensing for the fingerprint sensing sub-region with total detected fingerprint minutiae below a predetermined amount (for example below 3). With reference also to FIG. 7A, in the step S114, the fingerprint minutiae number counted the fingerprint sensing sub-regions C and G is zero, the fingerprint minutiae number counted the fingerprint sensing sub-region D is 1, and the fingerprint minutiae number counted the fingerprint sensing sub-region H is 2. Therefore, the fingerprint sensing IC 50 will not perform fingerprint sensing for the fingerprint sensing sub-region C, D, G and H, namely, for the fingerprint sensing sub-region with total detected fingerprint minutiae below the predetermined amount in the user identification process for granting user request or access right. In other words, the fingerprint sensing for the fingerprint sensing sub-regions C, D, G and H is skipped.

With reference back to FIG. 4, in the user identification process for granting user request or access right, the fingerprint sensing IC 50 first executes step S120 to perform fingerprint sensing for part of the fingerprint sensing sub-regions, which are defined in step S110 or modified after step S116. For example, the fingerprint sensing IC 50 does not perform fingerprint sensing for the fingerprint sensing sub-regions C, D, G and H, namely, skip the fingerprint sensing for those fingerprints sensing sub-regions with total detected fingerprint minutiae below the predetermined amount in the user identification process for granting user request or access right. In other word, the fingerprint sensing IC 50 only performs fingerprint sensing for part of the fingerprint sensing sub-regions, namely, the fingerprint sensing sub-regions A, B, E, F and I in step S120 and detects the fingerprint minutiae and the relevant locations for those fingerprint minutiae in the fingerprint sensing sub-regions A, B, E, F and I. Similarly, the relevant locations may include the location number for the fingerprint sensing sub-region and the relative coordinate of the fingerprint minutia in the corresponding fingerprint sensing sub-region. Alternatively, the relevant locations may be the absolute coordinate of the fingerprint minutia in the absolute coordinate in the whole fingerprint sensing area. According to an embodiment of the present invention, the fingerprint sensing IC 50 compares the fingerprint minutiae and the relevant locations sensed in the fingerprint sensing sub-regions A, B, E, F and I with respect to the fingerprint minutiae and the relevant locations corresponding to the fingerprint sensing sub-regions A, B, E, F, I and pre-stored in the step S112, thus determine whether the fingerprint minutiae in a relevant location for the identification stage is matched with the fingerprint minutiae in the relevant location in the registration stage.

With reference also to FIG. 3, if in step S112 (registration stage), the fingerprint minutia corresponding to the fingerprint sensing sub-region A and relative coordinate (2, 2) is bifurcation minutia, while the currently-detected fingerprint minutia (the fingerprint minutia detected in step S120) corresponding to the fingerprint sensing sub-region A and relative coordinate (2, 2) is ridge end minutia, this means the match is not successful (not matched). On the other hand, if in step S112 (registration stage), the fingerprint minutia corresponding to the fingerprint sensing sub-region A and relative coordinate (2, 2) is bifurcation minutia, while the currently-detected fingerprint minutia (the fingerprint minutia detected in step S120) corresponding to the fingerprint sensing sub-region A and relative coordinate (2, 2) is also bifurcation end minutia, this means the match is successful. The fingerprint sensing IC 50 may count the number of the detected fingerprint minutia (the fingerprint minutia detected in step S120), which are matched with the counterpart pre-stored fingerprint minutia. For example, the fingerprint sensing IC 50 adds 1 to the counted result when the detected fingerprint minutia is matched with the counterpart pre-stored fingerprint minutia at corresponding relevant location. The match counts in the fingerprint sensing sub-regions A, B, E, F and I are summed and the summation of the match counts is compared with a predetermined count threshold (for example, the predetermined count threshold is 16). If the summation of the match counts in the fingerprint sensing sub-regions A, B, E, F and I is larger than the predetermined count threshold, this means that the current user under test is the genuine user registered in the database and the fingerprint identification apparatus 100 grants the current user with access right (S130). Otherwise, if the summation of match counts in the fingerprint sensing sub-regions A, B, E, F and I is not larger than the predetermined count threshold, the identification stage is ended and the fingerprint identification apparatus 100 does not grant the current user with access right (S132). Alternatively, the fingerprint identification apparatus 100 may allow the current user to try a limited times (for example 5 times) before the identification stage is ended.

Figure 7B:
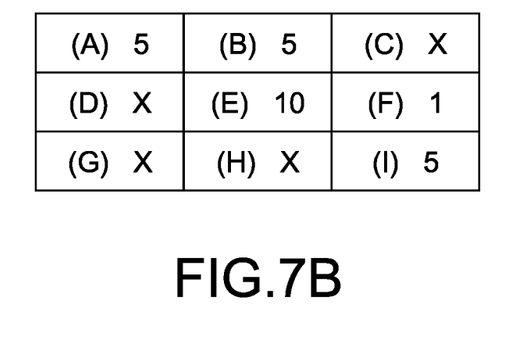
FIG. 7B is a schematic diagram showing the statistic of fingerprint minutiae in the sensing sub-regions, which are detected in the identification stage.

According to another embodiment of the present invention, the fingerprint sensing IC 50 may optionally execute step S122 after the step S120 to count the total number of the fingerprint minutiae detected in step S120 for each of the fingerprint sensing sub-regions A, B, E, F and I. As shown in FIG. 7B, after scanning part of the fingerprint sensing sub-regions for the user to be identified, the fingerprint sensing IC 50 knows that the fingerprint sensing sub-region A has 5 detected fingerprint minutiae, the fingerprint sensing sub-region B has 5 detected fingerprint minutiae, the fingerprint sensing sub-region E has 10 detected fingerprint minutiae, the fingerprint sensing sub-region F has 1 detected fingerprint minutia, the fingerprint sensing sub-region I has 5 detected fingerprint minutiae. With reference again to FIG. 7A, in the databased established in the step S112, the fingerprint sensing sub-region A has 8 pre-stored fingerprint minutiae, the fingerprint sensing sub-region B has 4 pre-stored fingerprint minutiae, the fingerprint sensing sub-region E has 10 pre-stored fingerprint minutiae, the fingerprint sensing sub-region F has 4 pre-stored fingerprint minutiae, the fingerprint sensing sub-region I has 6 pre-stored fingerprint minutiae. The fingerprint sensing IC 50 compares the number of the detected fingerprint minutiae, which is detected in step S120, in each of fingerprint sensing sub-regions A, B, E, F and I, with the number of the pre-stored fingerprint minutiae, which is stored in step S114 for each counterpart fingerprint sensing sub-region, and obtains a difference value there between. The fingerprint sensing IC 50 further assigns a weighting factor for each of the difference value. More particularly, the weighting factor for a fingerprint sensing sub-region is larger when the difference value for the fingerprint sensing sub-region is smaller; the weighting factor for a fingerprint sensing sub-region is smaller when the difference value for the fingerprint sensing sub-region is larger. For example, the difference value for the fingerprint sensing sub-region E is 0, then the fingerprint sensing IC 50 assigns a maximal weighting factor (such as 10) for the fingerprint sensing sub-region E. The difference value for the fingerprint sensing sub-region B (or the fingerprint sensing sub-region I) is 1, then the fingerprint sensing IC 50 assigns a mediate weighting factor smaller than the maximal weighting factor (such as 8) for the fingerprint sensing sub-region B (or the fingerprint sensing sub-region I). The difference value for the fingerprint sensing sub-region A (or the fingerprint sensing sub-region F) is 3, then the fingerprint sensing IC 50 assigns a smaller weighting factor smaller than the mediate weighting value (such as 2) for the fingerprint sensing sub-region A (or the fingerprint sensing sub-region F). Afterward, the fingerprint sensing IC 50 calculated the sum of the weighted values, each of the weighted values is number of matched fingerprint minutiae multiplied by the corresponding weighting factor. If the fingerprint sensing sub-region E has 8 matched fingerprint minutiae (both the type of fingerprint minutia and the relevant location of the fingerprint minutiae in identification stage are matched with the type of fingerprint minutia and the relevant location of the fingerprint minutiae in registration stage), then the weighted value is 8×10=80. If the fingerprint sensing sub-regions B and I have 3 and 5 matched fingerprint minutiae, respectively, then the sum of the weighted values is 80+(3×8)+(5×8)=144. If the granting threshold set by the fingerprint sensing IC 50 is 100, then the sum of the weighted values exceeds the granting threshold. The fingerprint sensing IC 50 determines that the identification is successful and grants the current user with access right (S130). Moreover, at this time, the fingerprint sensing IC 50 does not need to perform fingerprint sensing for the remaining fingerprint sensing sub-regions (namely, the fingerprint sensing sub-regions A and F), the time spent for the identification can be greatly reduced.

According to another embodiment of the present invention, the fingerprint sensing IC 50 may preferentially perform the summation of the weighted value for the fingerprint sensing sub-region with more pre-stored fingerprint minutiae, if two fingerprint sensing sub-regions have the same weighting factor. For the above example, the fingerprint sensing IC 50 preferentially performs the summation of the weighted values for the fingerprint sensing sub-region I (with 6 pre-stored fingerprint minutiae) instead of fingerprint sensing sub-region B (with 4 pre-stored fingerprint minutiae), even though the two fingerprint sensing sub-regions have the same weighting factor of 8. If the fingerprint sensing sub-region I has 5 matched fingerprint minutiae, then the sum of the weighted values is 80+(5×8)=120 after adding with the weighted value 80 for the fingerprint sensing sub-region E. The sum of the weighted values is larger than the granting threshold (100) set by the fingerprint sensing IC 50. The fingerprint sensing IC 50 determines that the identification is successful and grants the current user with access right (S130). Moreover, at this time, the fingerprint sensing IC 50 does not need to perform fingerprint sensing for the remaining fingerprint sensing sub-regions (namely, the fingerprint sensing sub-regions A, B and F), the time spent for the identification can be further reduced.

In above description, the predetermined amount and the granting threshold are set by specific program in advance. The specific program may be for example but not limited to, a system booting program, a remote payment program, an access setting program, an online meeting program, a net pals making program or other program needing user identification.

To sum up, the present invention has following advantages:

1. The rapid identification method of the present invention divides the fingerprint sensing area into a plurality of fingerprint sensing sub-regions in the registration stage, and then performs fingerprint sensing only for a part of the fingerprint sensing sub-regions to extract fingerprint minutiae and corresponding relevant locations in the identification stage, the time spent for identification can be greatly reduced.

2. The rapid identification method of the present invention divides the fingerprint sensing area into a plurality of fingerprint sensing sub-regions and uses shift register and multiplex for accessing the fingerprint sensing sub-regions. The fingerprint identification apparatus employing the rapid identification method can perform fingerprint sensing for at least two fingerprint sensing sub-regions at the same time.

3. The identification threshold can be flexibly set based on the degree of securities by using a specific program to set the predetermined amount and the granting threshold. The specific program may be a system booting program, a remote payment program, an access setting program, an online meeting program, a net pals making program or other program needing user identification. The identification threshold can be higher (such as increasing granting threshold) for remote payment program and the identification threshold can be higher (such as decreasing granting threshold) for application not demanding high level security.

Thus, particular embodiments have been described. Other embodiments are within the scope of the following claims. For example, the actions recited in the claims may be performed in a different order and still achieve desirable results.

What is claimed is:

1. A rapid identification method for fingerprint, comprising:
    (a) providing a fingerprint identification apparatus having a fingerprint sensing area, a circumference of fingerprint sensing area being not less than 48 mm; dividing the fingerprint sensing area into a plurality of fingerprint sensing sub-regions for fingerprint sensing;
    (b) performing fingerprint sensing for all of the fingerprint sensing sub-regions to obtain fingerprint image for a whole fingerprint sensing area, a plurality of fingerprint minutiae and relevant locations for the fingerprint minutiae; pre-storing the fingerprint minutiae and relevant locations for the fingerprint minutiae corresponding to the whole fingerprint sensing area in the fingerprint identification apparatus;
    (c) based on the pre-stored fingerprint minutiae and relevant locations, performing fingerprint sensing on a part of the fingerprint sensing sub-regions for a user to be identified and detecting a plurality of fingerprint minutiae and relevant locations for the fingerprint minutiae in the part of the fingerprint sensing sub-regions; and
    (d) comparing the fingerprint minutiae and relevant locations for the fingerprint minutiae detected in the step (c) and the corresponding fingerprint minutiae and relevant locations for the fingerprint minutiae pre-stored in the step (b) in order to determine whether the user can be granted with access right,
    wherein the fingerprint identification apparatus performs fingerprint sensing for at least two fingerprint sensing sub-regions at the same time.

2. The rapid identification method in claim 1, wherein the fingerprint identification apparatus comprises a plurality of sensing electrodes.

3. The rapid identification method in claim 1, wherein the fingerprint minutia is ridge end, bifurcation, crossover, short ridge, spike, island or bridge.

4. The rapid identification method in claim 1, wherein the step (b) further comprising: pre-storing a sum of total number of fingerprint minutiae detected in each of the fingerprint sensing sub-regions.

5. The rapid identification method in claim 1, wherein in the step (b) a total number of the fingerprint minutia in the whole fingerprint sensing area is not less than 20.

6. The rapid identification method in claim 1, wherein in the step (c) the fingerprint sensing is not performed for the fingerprint sensing sub-region without pre-stored fingerprint minutia.

7. A rapid identification method for fingerprint, comprising:
(a) providing a fingerprint identification apparatus having a fingerprint sensing area, a circumference of fingerprint sensing area being not less than 48 mm; dividing the fingerprint sensing area into a plurality of fingerprint sensing sub-regions for fingerprint sensing;
(b) performing fingerprint sensing for all of the fingerprint sensing sub-regions to obtain fingerprint image for a whole fingerprint sensing area, a plurality of fingerprint minutiae and relevant locations for the fingerprint minutiae; pre-storing the fingerprint minutiae and relevant locations for the fingerprint minutiae corresponding to the whole fingerprint sensing area in the fingerprint identification apparatus;
(c) based on the pre-stored fingerprint minutiae and relevant locations, performing fingerprint sensing on a part of the fingerprint sensing sub-regions for a user to be identified and detecting a plurality of fingerprint minutiae and relevant locations for the fingerprint minutiae in the part of the fingerprint sensing sub-regions; and
(d) comparing the fingerprint minutiae and relevant locations for the fingerprint minutiae detected in the step (c) and the corresponding fingerprint minutiae and relevant locations for the fingerprint minutiae pre-stored in the step (b) in order to determine whether the user can be granted with access right,
wherein in the step (b) the relevant location includes a location number of the fingerprint sensing sub-region and a relative coordinate of the fingerprint minutia in the fingerprint sensing sub-region.

8. The rapid identification method in claim 7, wherein in the step (b) the relevant location further includes an absolute coordinate in the fingerprint sensing area.

9. The rapid identification method in claim 7, wherein the step (b) further comprising: pre-storing a sum of total number of fingerprint minutiae detected in each of the fingerprint sensing sub-regions.

10. The rapid identification method in claim 7, wherein in the step (b) a total number of the fingerprint minutia in the whole fingerprint sensing area is not less than 20.

11. The rapid identification method in claim 7, wherein wherein in the step (c) the fingerprint sensing is not performed for the fingerprint sensing sub-region without pre-stored fingerprint minutia.

12. A rapid identification method for fingerprint, comprising:
(a) providing a fingerprint identification apparatus having a fingerprint sensing area, a circumference of fingerprint sensing area being not less than 48 mm; dividing the fingerprint sensing area into a plurality of fingerprint sensing sub-regions for fingerprint sensing;
(b) performing fingerprint sensing for all of the fingerprint sensing sub-regions to obtain fingerprint image for a whole fingerprint sensing area, a plurality of fingerprint minutiae and relevant locations for the fingerprint minutiae; pre-storing the fingerprint minutiae and relevant locations for the fingerprint minutiae corresponding to the whole fingerprint sensing area in the fingerprint identification apparatus;
(c) based on the pre-stored fingerprint minutiae and relevant locations, performing fingerprint sensing on a part of the fingerprint sensing sub-regions for a user to be identified and detecting a plurality of fingerprint minutiae and relevant locations for the fingerprint minutiae in the part of the fingerprint sensing sub-regions; and
(d) comparing the fingerprint minutiae and relevant locations for the fingerprint minutiae detected in the step (c) and the corresponding fingerprint minutiae and relevant locations for the fingerprint minutiae pre-stored in the step (b) in order to determine whether the user can be granted with access right,
wherein the step (b) further comprises: pre-storing a total number of fingerprint minutia in each of the fingerprint sensing sub-regions;
wherein the step (c) further comprises: counting a total number of fingerprint minutia in each of the fingerprint sensing sub-regions.

13. The rapid identification method in claim 12, further comprising: calculating a difference value between the pre-storing total number of the fingerprint minutiae in one fingerprint sensing sub-region obtained in step (c) and the total number of fingerprint minutiae in the one fingerprint sensing sub-region obtained in step (d), and assigning a weighting factor for each of the fingerprint sensing sub-region based on the difference value.

14. The rapid identification method in claim 13, wherein the step (d) further comprises: obtaining a sum of the weighted values based on the weighting factor and a number of matched fingerprint minutia in each of the fingerprint sensing sub-region processed in the step (c) and determining whether the user can be granted with access right by comparing the sum of the weighted values with a granting threshold.

15. The rapid identification method in claim 14, wherein the granting threshold is preset by a specific program, the specific program is a system booting program, a remote payment program, an access setting program, an online meeting program, or a net pals making program.

16. The rapid identification method in claim 12, wherein in the step (c) the fingerprint sensing is not performed for the fingerprint sensing sub-region with pre-stored fingerprint minutia less than a predetermined amount.

17. The rapid identification method in claim 16, wherein the predetermined amount is preset by a specific program, the specific program is a system booting program, a remote payment program, an access setting program, an online meeting program, or a net pals making program.

18. The rapid identification method in claim 12, wherein the step (b) further comprising: pre-storing a sum of total number of fingerprint minutiae detected in each of the fingerprint sensing sub-regions.

19. The rapid identification method in claim 12, wherein in the step (b) a total number of the fingerprint minutia in the whole fingerprint sensing area is not less than 20.

20. The rapid identification method in claim 12, wherein in the step (c) the fingerprint sensing is not performed for the fingerprint sensing sub-region without pre-stored fingerprint minutia.

* * * * *